(12) United States Patent
Nichols (10) Patent No.: US 6,672,336 B2
(45) Date of Patent: Jan. 6, 2004

(54) DUAL RANDOM ACCESS, THREE-WAY ROTARY VALVE APPARATUS

(75) Inventor: Jon A. Nichols, Forestville, CA (US)

(73) Assignee: Rheodyne, LP, Rohnert Park, CA (US)

( * ) Notice: Subject to any disclaimer, the term of this patent is extended or adjusted under 35 U.S.C. 154(b) by 199 days.

(21) Appl. No.: 09/998,529

(22) Filed: Nov. 28, 2001

(65) Prior Publication Data

US 2003/0098076 A1 May 29, 2003

(51) Int. Cl.[7] .............................................. F16K 11/074
(52) U.S. Cl. ............................. 137/625.46; 137/625.11
(58) Field of Search ........................ 137/625.46, 625.11

(56) References Cited

U.S. PATENT DOCUMENTS

| | | | |
|---|---|---|---|
| 3,411,525 A | 11/1968 | Auger | |
| 3,477,207 A | 11/1969 | Auger | |
| 3,504,799 A | 4/1970 | Ogle | |
| 3,747,630 A | 7/1973 | Hurrell | |
| 3,796,232 A | 3/1974 | Dalton | |
| 3,868,970 A | 3/1975 | Ayers et al. | |
| 4,068,528 A | 1/1978 | Gundelfinger | |
| 4,243,071 A | 1/1981 | Shackelford | |
| 4,367,645 A | 1/1983 | Froment | |
| 4,444,066 A | 4/1984 | Ogle et al. | |
| 4,614,204 A | 9/1986 | Dolejs | |
| 4,625,569 A | 12/1986 | Toei et al. | |
| 4,705,627 A | 11/1987 | Miwa et al. | |
| 5,010,921 A | 4/1991 | Nohl | |
| 5,105,851 A | 4/1992 | Fogelman | |
| 5,437,304 A | * 8/1995 | Delcroix | ...................... 137/595 |
| 5,601,115 A | 2/1997 | Broerman | |
| 5,803,117 A | 9/1998 | Olsen et al. | |
| 6,012,487 A | 1/2000 | Hauck | |
| 6,012,488 A | 1/2000 | Nichols | |
| 6,155,123 A | 12/2000 | Bakalyar | |

* cited by examiner

Primary Examiner—John Fox
(74) Attorney, Agent, or Firm—Beyer Weaver & Thomas LLP (57) ABSTRACT

A multi-function, random access, dual, three-way valve for use with fluid switching and the like is provided, whereby a first fluid flow to the valve is selectively placed in fluid communication with a first or a second outlet passage from the valve for selectively transferring the first fluid flow and a second fluid flow to the valve is, independent of the flow path of the first fluid, selectively placed in fluid communication with a third or a fourth outlet from the valve for simultaneously transferring the second fluid flow. A rotor element rotatably movable relative to a stationary stator element to at least four discrete angular positions actuates to multi-function switching capabilities of the valve when the rotor element is selectively placed in one of the at least four discrete positions. The valve directs the first fluid flow to one of two alternate outlet passages and, simultaneously and independently, directs the second fluid flow to one of at least two different outlet passages.

29 Claims, 9 Drawing Sheets

DUAL RANDOM ACCESS, THREE-WAY ROTARY VALVE APPARATUS

TECHNICAL FIELD

The present invention relates to multi-function rotary valves and, more particularly, relates to a random-access, dual, three-way, rotary switching valve for use with high-pressure liquid chromatography (HPLC), other analytical methods and the like.

BACKGROUND ART

A "three-way" switching valve provides a means for selectively routing a fluid input flow to the valve to one of two alternate output flows from the valve. A "rotary" valve is of the type wherein fluid flow is directed by rotating a valve rotor element to discrete angular positions relative to a stationary valve stator element. A "dual" rotary valve provides two valves in one valve body, both simultaneously operated by the positioning of the valve rotor. Rotary switching valves are commonly used, for example, in HPLC and other analytical methods to selectively direct a flow stream of one or more fluids along alternate paths to an analytical device or containment vessel.

Figure 1:
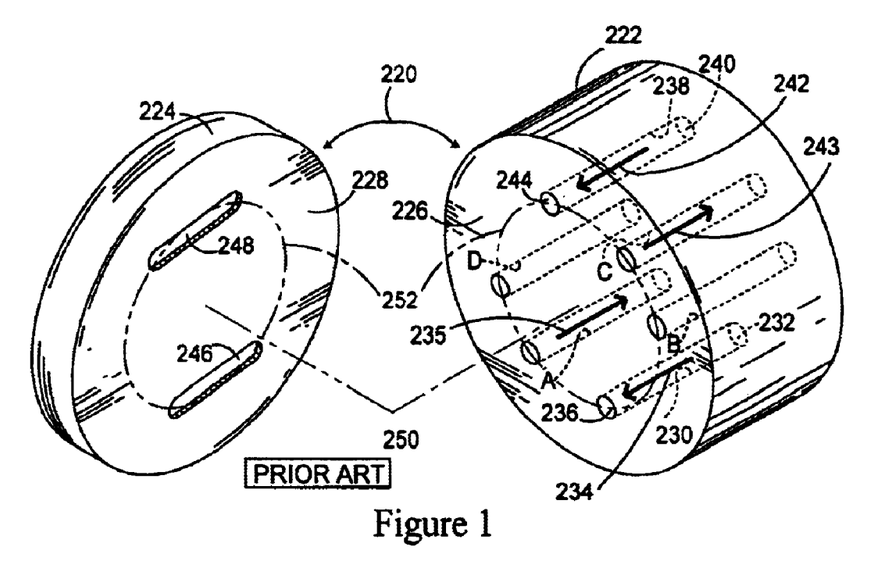
FIG. 1 is an exploded, isometric view of a prior art dual, three-way, rotary-switching valve.

One conventional type of dual, three-way, switching valve 220, as shown in FIG. 1, includes a disc-shaped rotor with a set of rotor grooves in the front face of the rotor that contacts, in a fluid-tight manner, the face of a cylindrically shaped stator body at a rotor-stator interface. Inlet passages and outlet passages, longitudinally bored through the stator body to the rotor-stator interface, are selectively fluidly coupled through the rotor grooves corresponding to the rotation of the rotor relative to the stator. Pivoting of the rotor enables the rotor grooves to fluidly couple selected passages of the stator, depending on their placement on the rotor and the angular position of the valve rotor. Model 7030 of Rheodyne, L. P. is an example of this type of switching valve.

In FIG. 1, valve 220 has a stator element 222 and a rotor 224. The stator element 222 defines a stator face 226 that opposes and is in fluid-tight contact with a rotor face 228 defined by rotor 224. The stator element 222 further defines a first inlet passage 230 that has one end 232 adapted to fluidly couple to a first fluid source (Not Shown) supplying a first fluid and has an opposite first inlet port 236 terminating at stator face 226. Similarly, stator element 222 further defines a second inlet passage 238 that has one end 240 adapted to fluidly couple to a second fluid source (Not Shown) supplying a second fluid and has an opposite second inlet port 244 terminating at stator face 226. The stator element 222 further defines a first outlet passage A, a second outlet passage B, a third outlet passage C, and a fourth outlet passage D, all in fluid communication with stator face 226.

The rotor 224, as shown, defines a first rotor groove 246 and a second rotor groove 248, both formed in the rotor face and adapted to transfer fluid. At the perimeter of rotor grooves 246 and 248, a fluid-tight seal is formed at the rotor-stator interface thus providing for the containment of any fluid within the rotor grooves and avoiding fluid leakage between the rotor and stator at the rotor-stator interface. Rotor 224 is rotatably movable about an axis of rotation 250, normal to and at the center of stator face 226, between two discrete angular positions with respect to stator element 222 (FIGS. 2A and 2B).

Figure 2A:
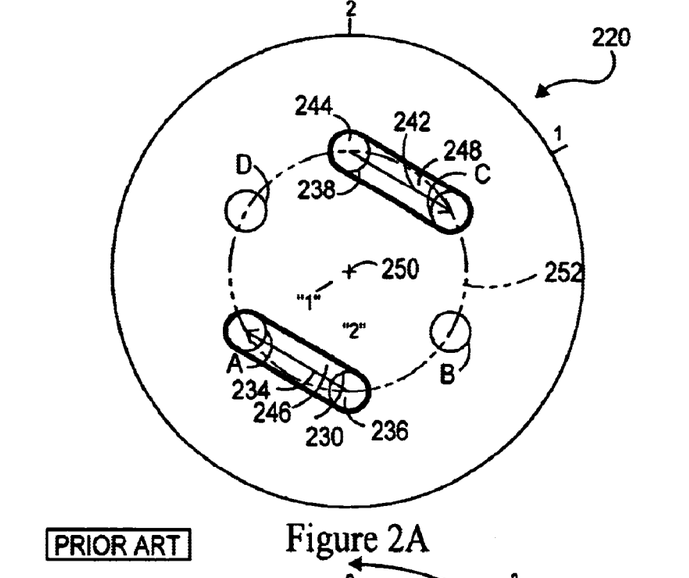
FIGS. 2A and 2B is series of schematic views of the rotor-stator interface plane of the prior art dual, three-way switching valve of FIG. 1 in a first and second discrete rotor position.
Figure 2B:
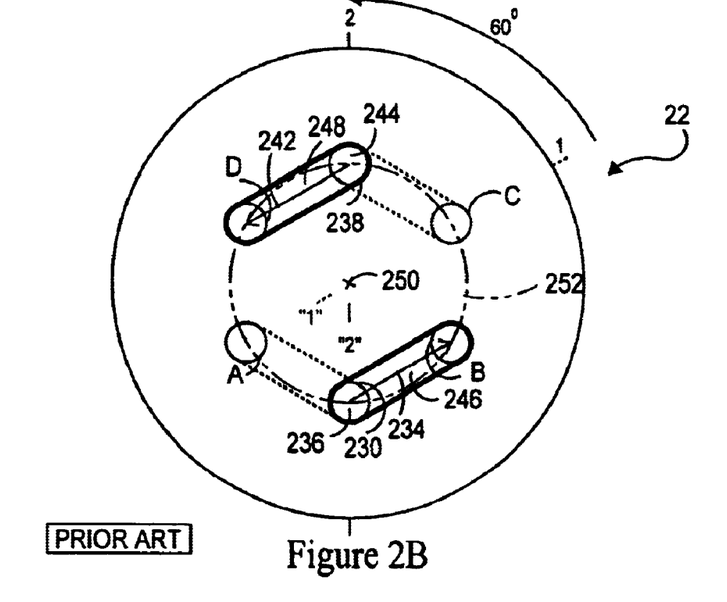
Figure 3:
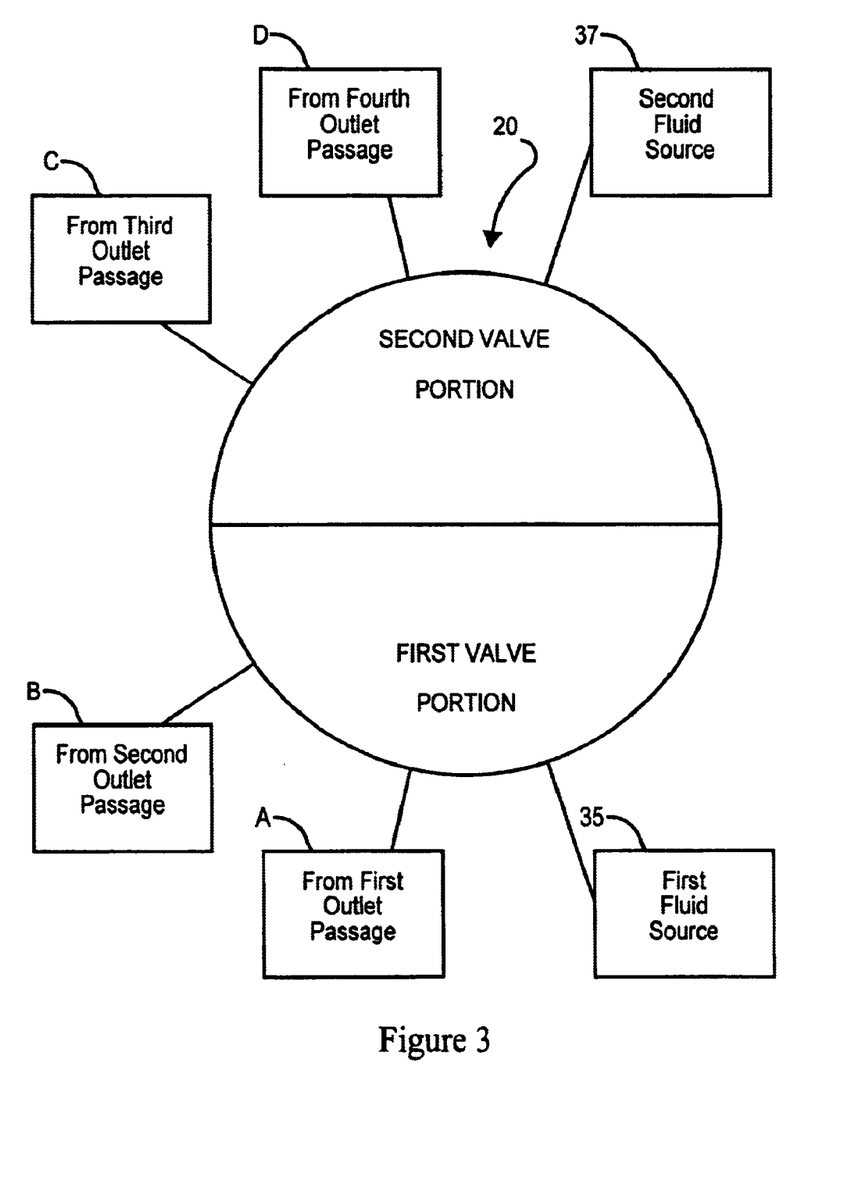
FIG. 3 is a schematic diagram of a system incorporating a dual, three-way, rotary-switching valve constructed in accordance with the present invention.

FIGS. 2A–2B show schematic views of the rotor-stator interface of the prior art valve of FIG. 1 in two discrete modes of operation, looking at the stator surface 226, with the rotor 224 being transparent. The valve 220 provides two position fluid output switching of two separate input fluids. The two modes of operation depicted correspond to the positioning of controlling rotor 224 in one of its two discrete angular positions indicated by markings "1" and "2" on rotor face 228. In the operation of the valve 220, the first fluid and the second fluid from the first and second fluid source, respectively, are pressurized by a suitable means, such as a pump (Not Shown), to provide a motivating force for fluid flow.

In a typical configuration, inlet ports 236 and 244 and outlet passages A, B, C, and D as well as rotor grooves 246 and 248 are all contained on an imaginary circle 252 concentric with axis 250 at the rotor-stator interface. All inlet and outlet passages are circumferentially spaced apart at an arc angle of about 60° about imaginary circle 252.

As shown in FIG. 1 and FIG. 2A, in the first discrete angular position "1" of the valve, the first rotor groove 246 fluidly couples the first inlet passage 230 to the first outlet passage A, and the second rotor groove 248 fluidly couples the second inlet passage 238 to the third outlet passage C. Accordingly, as the first fluid flows through the first inlet passage 230 in the direction of arrow 234 of FIG. 1, the first rotor groove 246 directs the flow out of the first outlet passage A in the direction of arrow 235. Similarly, as the second fluid flows through the second inlet passage 238 in the direction of arrow 242, the second rotor groove 248 directs the flow out of the second outlet passage C in the direction of arrow 243.

In the second discrete angular position "2" of the valve, referring now to FIG. 2B, the rotor face is rotated 60° counterclockwise (Position "1" of rotor grooves 246 and 248 is shown in dashed line). The first rotor groove 246, as shown, fluidly couples the first inlet passage 230 to the second outlet passage B, and similarly the second rotor groove 248 fluidly couples the second inlet passage 238 to the fourth outlet passage D.

Table 1 summarizes the operating modes of the prior art valve 220 when rotor face 228 is placed in each of its two discrete operating positions "1" and "2".

TABLE 1

| ROTOR POSITION | FIRST FLUID | SECOND FLUID |
| --- | --- | --- |
| 1 | FIRST INLET PASSAGE 230 TO OUTLET PASSAGE A | SECOND INLET PASSAGE 238 TO OUTLET PASSAGE C |
| 2 | FIRST INLET PASSAGE 230 TO OUTLET PASSAGE B | SECOND INLET PASSAGE 238 TO OUTLET PASSAGE D |

Thus, it is possible with the prior art switching valve 220 to selectively direct the flow of the first fluid to the first outlet passage A while the flow of the second fluid is directed to the third outlet passage C (i.e., position "1") or, alternatively, to direct the flow of the first fluid to second outlet passage B while the flow of the second fluid is directed to the fourth outlet passage D (i.e., position "2"). Simple reciprocation of rotor 224 between each of the two discrete operating positions "1" and "2" of valve 220 relocates the rotor grooves 246 and 248 to fluidly connect the two inlet passages 230 and 238 to different pairs of outlet passages A/C and B/D.

One problem associated with this arrangement, however, is that it lacks fluid flow routing versatility. For example, it is often desirable under certain circumstances relating to the operation of analytical devices and the like, to fluidly couple the first inlet passage 230 to the first outlet passage A while the second inlet passage 238 is fluidly coupled to the fourth outlet passage D. Similarly, it is often desirable to fluidly couple the first inlet passage 230 to the second outlet passage B while the second inlet passage 238 is fluidly coupled to the third outlet passage C.

In the current valve design, selective directing of the first and second fluids is accomplished in a "tandem" or "linked" operation. That is, in a mutually exclusive manner, the second fluid is directed to third outlet passage C only when the first fluid is directed to first outlet passage A when the rotor is placed in first discrete position "1", and the second fluid is directed to fourth outlet passage D only when the first fluid is directed to second outlet passage B when the rotor 224 is placed in second discrete position "2". It is not possible with prior art valve 220 for the first fluid to randomly access one of either the first outlet passage A or the second outlet passage B and, at the same time, for the second fluid to randomly access, independently, one of either the third outlet passage C or the fourth outlet passage D. For example, with valve 220, it is not possible for the first fluid to access first outlet passage A while the second fluid accesses fourth outlet passage D.

It would be possible to connect an additional single three-way valve to one of the first or second outlet passages A or B or to one of the third or fourth outlet passages C or D and thereby to selectively redirect the flow of the first fluid or the second fluid, respectively, to achieve the random access functionality described. This valving arrangement would provide random access of the first fluid to outlet passages A or B and, independently, provide access of the second fluid to either outlet passages C or D, respectively, through selective manipulation of the series of valves, but this would increase cost and size, and reduce the reliability of the valving system.

Modern laboratories have limited bench space, and they demand extremely high system reliability, even while placing a high premium on economy. A integral dual valve that could automatically provide for the access of the second fluid to either outlet passage C or D independent of the flow of the first fluid to outlet passages A or B would reduce cost and size and would increase reliability. There is a need for a dual, three-way, switching valve that provides for random access of two fluids to two possible outlet passages for each fluid.

DISCLOSURE OF INVENTION

The present invention provides a random access, dual, three-way, fluid switching rotor valve that selectively directs the flow of a first fluid to either one of at least two alternate outlet passages and, simultaneously and independently, selectively directs the flow of a second fluid to either one of at least two different outlet passages. Accordingly, unlike the previous dual, three-way rotor valves, any combination of fluid flows between the outlets is attainable.

Briefly, the valve apparatus includes a stator body having a stator face lying in an interface plane and a rotor element having a rotor face oriented in the interface plane in opposed relationship to and contacting with the stator face in a fluid-tight manner. The rotor element is pivotable about a rotational axis for rotational movement of the rotor face to at least four discrete angular positions relative to the stator face.

The stator element defines two independent inlet passages each having one end fluidly coupled to a respective fluid source for supplying a fluid. Both inlet passages further include opposite inlet ports which terminate at the stator face. Additionally, the stator element further defines at least three stator slots, and at least four independent outlet passages each of which is in fluid communication with the stator face. The first two outlet passages correspond to the first inlet passage, while the last two outlet passages correspond to the second inlet passage. The rotor element includes a rotor face which defines at least two rotor grooves. This face is rotatably mounted to the stator face in a fluid-tight manner, and between a first, a second, a third and a fourth rotor position.

The inlet ports, the outlet passages, and the stator slots of the stator element, and rotor grooves of the rotor element and stator slots collectively form a channel set which is arranged such that, in the first discrete rotor position, the first inlet port is fluidly coupled with the first outlet passage through a rotor groove and the second inlet port is coupled in fluid communication with the third outlet passage through another rotor groove. In the second discrete position, the first inlet port is maintained in fluid communication with the first outlet passage, while the second inlet port is fluidly coupled to the fourth outlet passage. In the third rotor position, the first inlet port is then fluidly coupled to second outlet passage through a rotor groove and the second inlet port is coupled in fluid communication with the third outlet passage through another rotor groove. Finally, in the fourth discrete rotor position, the first inlet port is maintained in fluid communication with the second outlet passage, while the second inlet port is fluidly coupled to fourth outlet passage.

In one embodiment of the present invention, the first inlet port of the stator is disposed at the rotational axis of the rotor element which is also the central longitudinal axis normal to the stator face. The second inlet port, by comparison, is disposed on a first imaginary circle lying in the interface plane and co-axial to the rotor valve rotational axis.

The stator face further defines a first outlet port of the first outlet passage, and a second outlet port of the second outlet passage, both of which lie in the first imaginary circle. A third outlet port of the third outlet passage, and a fourth outlet port of the fourth outlet passages both lie on a second imaginary circle of the interface plane which is concentric to the first imaginary circle. The second imaginary circle is of a diameter larger than that of first imaginary circle.

A first stator slot formed in the stator face lies in the first imaginary circle and is in fluid communication with the first outlet port, while a second stator slot is formed in the stator face, in the first imaginary circle, and is in fluid communication with the second outlet port. The stator face further includes a third stator slot lying on the first imaginary circle which is in fluid communication with the second inlet port.

In this one embodiment, the rotor face includes a first rotor groove which provides fluid communication between the first inlet passage and the first and second outlet passages, while a second and third rotor groove provide fluid communication between the second inlet passage and the third and fourth outlet passages, depending upon which discrete rotor position (i.e., first through fourth) the rotor valve is disposed.

The first rotor groove extends substantially radially from the rotational axis of the rotor valve to the first imaginary circle, having an inlet end in continuous fluid communication with the first inlet port. An outlet end of the first rotor groove is contained in the first imaginary circle, and in fluid communication with the first stator slot when the rotor is placed in the first or second discrete position. Thereby, the first inlet port is maintained fluidly coupled to the first outlet passage when the rotor is placed in the first or second discrete position. By comparison, in the third or fourth discrete rotor position, the outlet end of the first rotor groove is maintained in fluid communication with the second stator slot. Thus, the first inlet port is maintained fluidly coupled to the second outlet passage when the rotor is placed in the third or fourth discrete position.

In the second portion of the valve, both the second and third rotor grooves extend in a direction substantially radially from the rotational axis of the rotor element. In both rotor grooves, a respective inlet end thereof lies on the first imaginary circle and a respective outlet end thereof lies on the second imaginary circle. The second and third rotor grooves are preferably identical in configuration, but are spaced-apart angularly about the rotational axis. Thus, in the first and second discrete rotor positions, the inlet end of the second rotor slot is maintained in fluid communication with the second inlet passage, via the third stator slot. However, in the first discrete rotor position, the outlet end of the second rotor groove is in communication with the third outlet port while, in the second discrete rotor position, the outlet end of the second rotor groove is in communication with the fourth outlet port.

In contrast, in the third and fourth discrete rotor positions, the inlet end of the third rotor slot is maintained in fluid communication with the second inlet passage, via the third stator slot. However, in the third discrete rotor position, the outlet end of the third rotor groove is in communication with the third outlet port while, in the fourth discrete rotor position, the outlet end of the third rotor groove is in communication with the fourth outlet port.

BRIEF DESCRIPTION OF THE DRAWINGS

The valve of the present invention has other objects and features of advantage which will be more readily apparent from the following description of the best mode of carrying out the invention and the appended claims, when taken in conjunction with the accompanying drawing, in which:

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Figure 4:
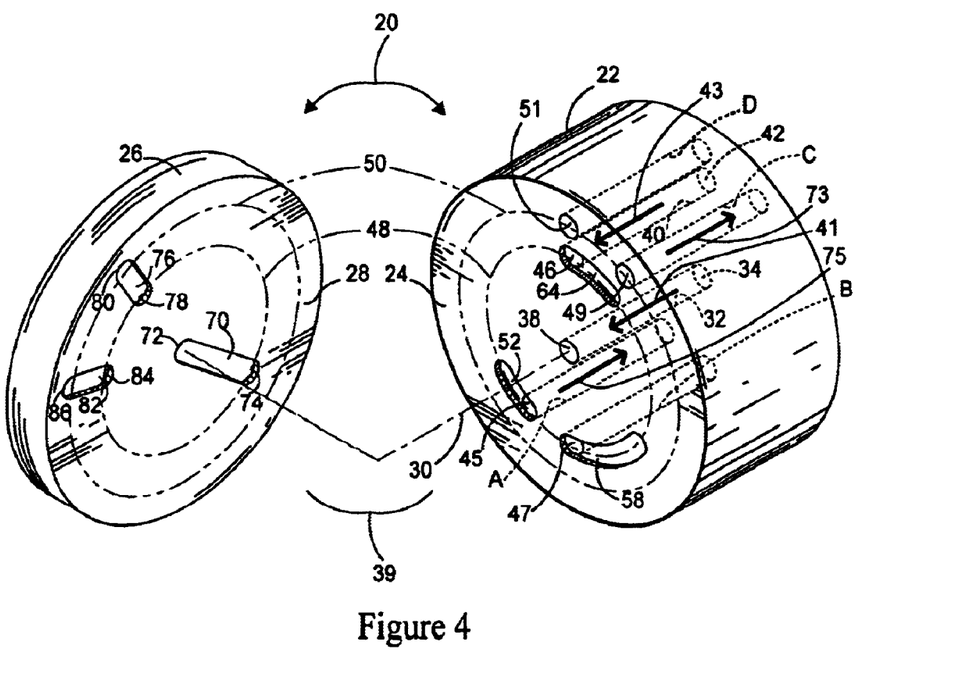
FIG. 4 is an exploded, isometric view of one embodiment of a dual, three-way, rotary-switching valve constructed in accordance with the present invention in a first operating mode.
Figure 5A:
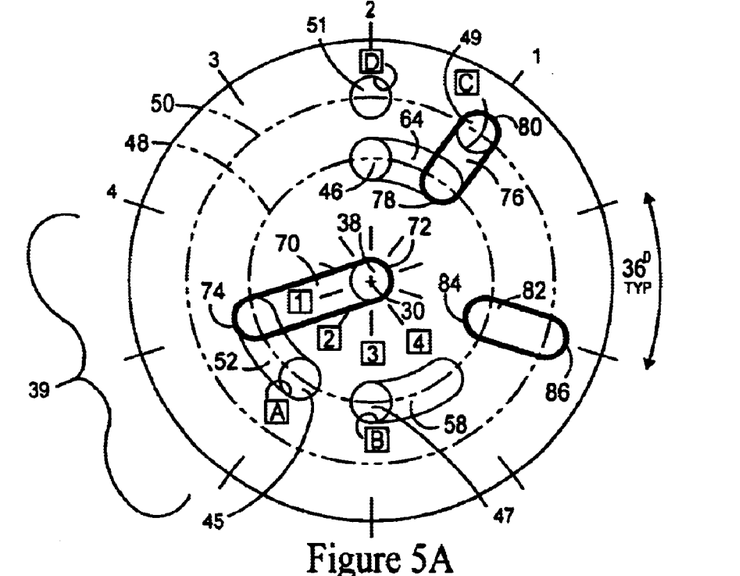
FIGS. 5A–5E is series of schematic views of the rotor-stator interface plane of the dual, three-way switching valve of FIG. 4 illustrating operation in a first through fourth discrete rotor position.
Figure 5B:
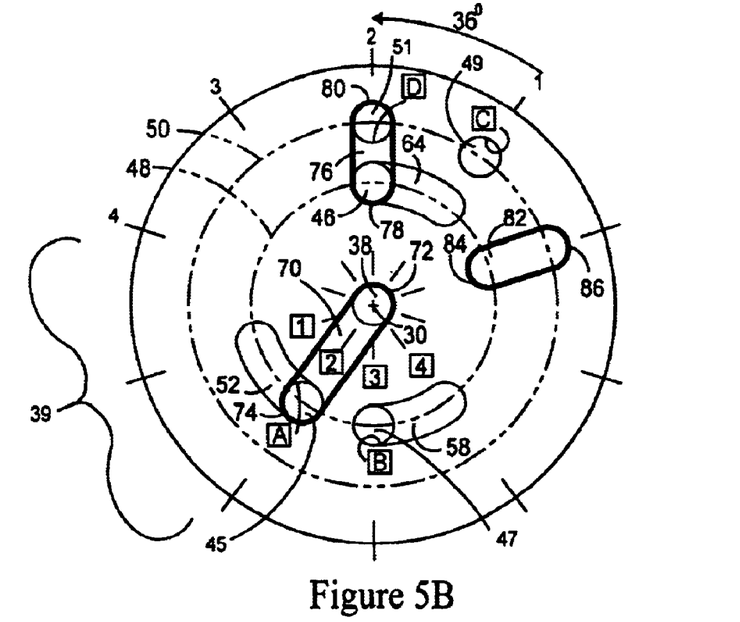
Figure 5C:
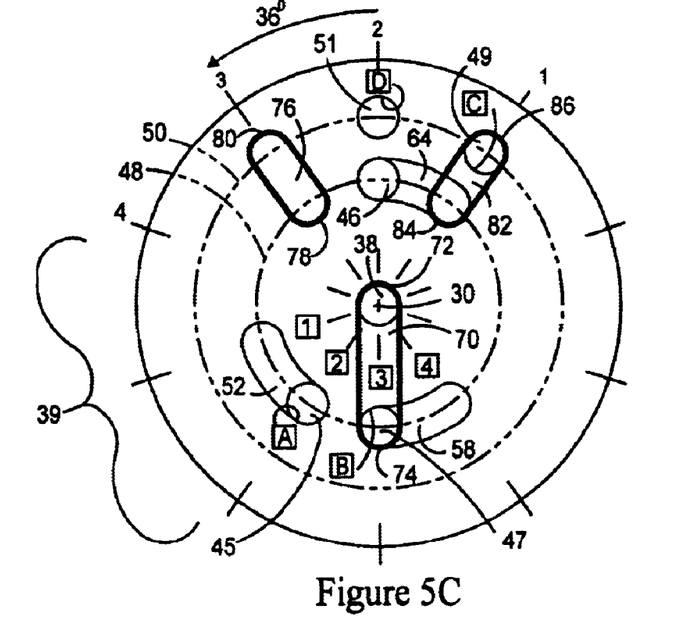
Figure 5D:
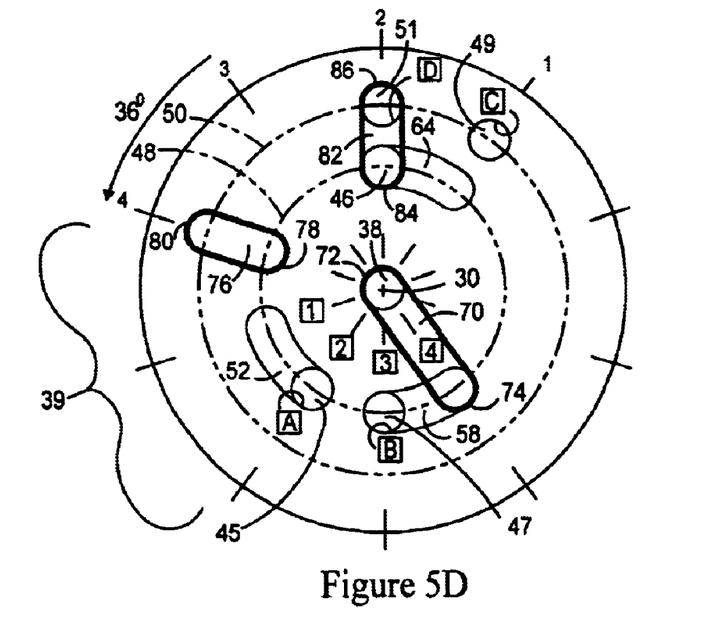

Referring now to FIGS. 3, 4 and 5A–5D, a dual, random access, 3-way fluid switching valve apparatus, generally designated 20, is illustrated. The valve includes a stator element 22 defining a first inlet passage 32 fluidly coupled to a first fluid source 35 and having a first inlet port 38 terminating at a stator face 24 lying in an interface plane. A second inlet passage 40 of the stator element 22 is fluidly coupled to a second fluid source 37, and includes a second inlet port 46 terminating at the stator face 24. As shown in FIG. 4, the stator element 22 further defines a first outlet passage A, a second outlet passage B, a third outlet passage C and a fourth outlet passage D, each in fluid communication with the stator face 24. The valve apparatus 20 further includes a rotor element 26 which defines a rotor face 28 oriented in the interface plane in opposed relationship to and contacting the stator face 24 in a fluid-tight manner. The rotor element 26 is rotatably movable about a rotational axis 30, relative to the stator face 24 for rotational movement of the rotor face 28 to at least a discrete first rotor position (FIG. 5A), a second rotor position (FIG. 5B), a third rotor position (FIG. 5C), and a fourth rotor position (FIG. 5D).

The rotor face 28 and the stator face 24 cooperatively define a channel set 39 enabling fluid communication between the first fluid source 35 and one of the first outlet passage A and second outlet passage B, and enabling fluid communication between the second fluid source 37 and one of the third outlet passage C and fourth outlet passage D. In particular, in the first rotor position (FIG. 5A), looking at stator surface 24 with the rotor element 26 transparent, the channel set 39 fluidly couples the first inlet port 38 to the first outlet passage A and fluidly couples the second inlet port 46 to the third outlet passage C. In the second rotor position (FIG. 5B), the channel set again fluidly couples the first inlet port 38 to the first outlet passage A, but then fluidly couples the second inlet port 46 to the fourth outlet passage D. In the third rotor position (FIG. 5C), by comparison, the channel set 39 now fluidly couples the first inlet port 38 to the second outlet passage B, while fluidly coupling the second inlet port 46 to the third outlet passage C. Finally, in the fourth rotor position (FIG. 5D), the channel set again fluidly couples the first inlet port 38 to the second outlet passage B, but then fluidly couples the second inlet port 46 to the fourth outlet passage D.

Accordingly, a dual, random access, three-way, rotary valve is disclosed which enables selective fluid switching of a first fluid to either one of at least two different outlet passages for the first three-way valve, and of a second fluid to either one of at least two different outlet passages for the second three-way valve. In this manner, complete fluid distribution versatility between the first and the second fluid sources, and their corresponding first and second outlet passages, and the third and fourth outlet passages is disclosed.

Briefly, the valve apparatus 20 of the present invention is particularly suitable for use with high-pressure liquid chromatography (HPLC), high-speed mass spectrophotometry, or other analytical methods in, for example, sample preparation or in directing analytical samples to several alternative detectors. Stepper motors are often used as a means to actuate the valve in robotic analytical systems. Suitable fluid pressurization means such as pumps are utilized to provide fluid flow through the valve, preferably by means of a high-pressure pump typically delivering continuously metered pressure ranging from about 1000 PSI to about 6000 PSI. These devices are commercially available and well-known in the art.

As previously indicated, the rotary valve apparatus of the present invention is operable in four distinct modes and provides fluid output switching functions on two separate valve input fluids. The valve receives two different fluid flows from two different sources and provides a set of channels (i.e., the channel set 39) which cooperate to direct these two fluids along alternate fluid output paths depending on the switching mode to which the valve is set. The two fluids are not intermingled, as the grooves and passages of the first valve portion are only used in the first valve. The four modes of operation correspond to the positioning of a valve rotor element in one of four discrete angular positions relative to a stationary stator element of the valve.

Figure 5E:
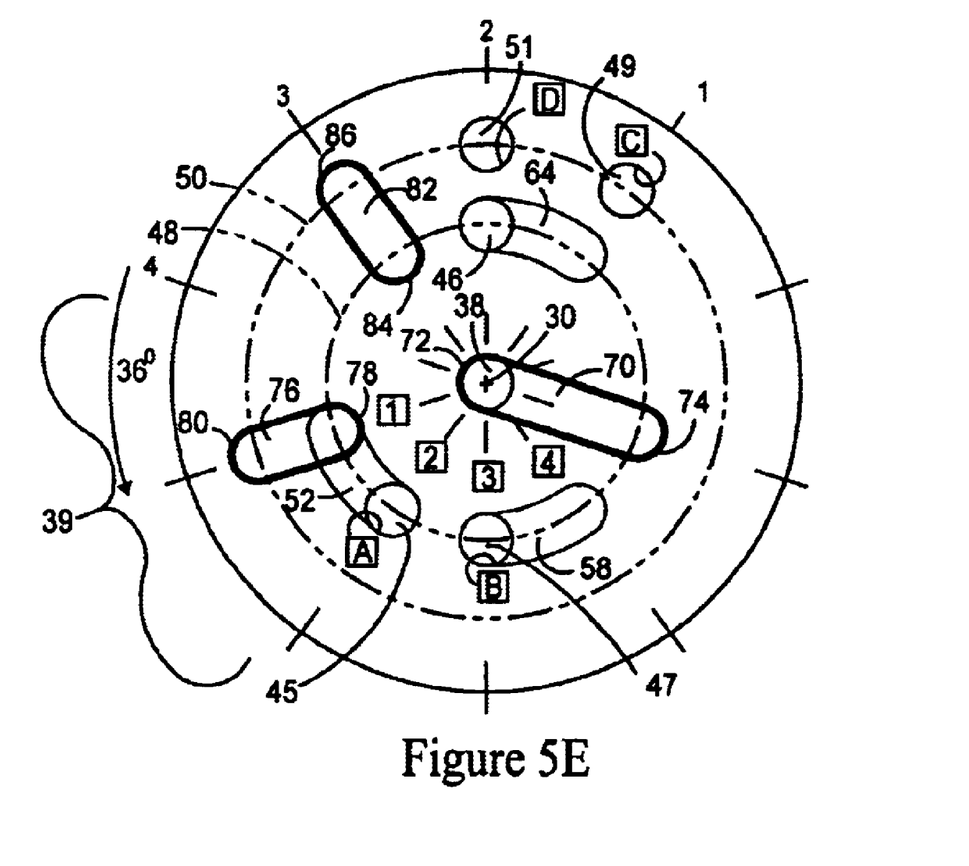

If some intermingling of the two fluids is allowed, then a fifth position, a closed position, can be added 36° counterclockwise from position 4 (see FIG. 5E). This new blocked position is not normally found in three-way valves and may be beneficial to the user. Both inlet flows are blocked, but the fluids in the grooves 76 and 52 can intermingle by diffusion. This closed position is a tandem closed and not Random Access.

Referring back FIG. 4, the stator element 22 and the rotor element 26 are preferably cylindrically shaped, having a stator face 24 and a rotor face 28, respectively, lying in an interface plane in opposed relationship to one another. Rotor element 26 is pivotable about a rotational axis 30 for rotational movement of the rotor element 26 relative to the stator element 22 to a selected one of four discrete angular positions shown in FIGS. 5A–5D, and as indicated by the markings "1", "2", "3", "4". The four discrete angular positions of rotor element 26 are preferably positioned apart by an arc angle of about 36°.

This same design sequence could be provided by 45° separation lines (i.e., the four discrete angular positions spaced at 45° arc angles) (not shown), but in this mode, the second and third rotor grooves would contact the first and second stator slots in positions one and four, allowing intermixing of the two fluids by dispersion. If this is allowed, a more compact design would result.

The stator portion of the channel set 39 includes two tubular fluid inlet passages 32, 40 longitudinally extending through stator element 22 and adapted to convey a fluid. In particular, a first inlet passage 32 has one open end 34 adapted to fluidly couple to a first fluid source 35 for supplying a first fluid (in the direction of arrow 41) in FIG. 4 and, an opposite first inlet port 38 terminating at stator face 24. A second inlet passage 40 is provided also extending longitudinally therethrough which includes one open end 42 adapted to fluidly couple to a second fluid source 37 for supplying a second fluid (in the direction of arrow 43 in FIG. 4) and, an opposite second inlet port 46 terminating at stator face 24. In one specific embodiment, as shown in FIG. 4, the first inlet port 38 is disposed at the axis of rotation 30 of the valve apparatus 20, while the second inlet passage 40 terminates at a first imaginary circle 48 about the rotational axis.

Additionally, stator element 22 further defines a first outlet passage A and second outlet passage B both of which are designated for fluid coupling with the first inlet passage 32, depending upon the discrete position of the rotor element, as shown in FIGS. 5A–5D. The first outlet passage A includes a first outlet port 45, while the second outlet passage B includes a second outlet port 47, both of which terminate at the stator face in alignment with the first imaginary circle 48. The second outlet port 47 is positioned along the first imaginary circle 48 apart from first outlet port 45 counterclockwise (FIGS. 5A–5D), preferably by an arc angle of about 36°. It will be appreciated, of course, that this arcuate spacing coincides with the spacing of the discrete rotor positions (i.e., at 36° intervals).

Corresponding to the second valve portion of the rotor valve apparatus 20 is a third outlet passage C and a fourth outlet passage D, each extending longitudinally through the stator. The third outlet passage C includes a third outlet port 49, while the fourth outlet passage D includes a fourth outlet port 51. Each of the third and fourth outlet port terminates at the stator face in alignment with the second imaginary circle 50 that is concentric with axis 30 and whose diameter is greater than the diameter of the first imaginary circle 48. Similar to the first and second outlet ports, the third and fourth outlet ports 49, 51 are designated for fluid coupling with the second inlet passage 40, depending upon the discrete position of the rotor element.

To correspond with the arcuate alignment between the first outlet port 45 and the second outlet port 47, the third outlet port 49 and the fourth outlet port 51 are also arcuately spaced by an arc angle of about 36° from one another. Moreover, the third outlet passage C is angularly positioned apart from first outlet passage A by an arc angle of about 180°, while the fourth outlet passage D is angularly positioned apart from second outlet passage B by an arc angle of about 180°. The fourth outlet passage D is further substantially in linear alignment with a radial line intersecting the rotational axis 30 and the second inlet port 46. All fluid outlet passages are preferably tubular-shaped and extend longitudinally through the stator element 22 to convey a fluid.

As best viewed in FIG. 4, a stator portion of the channel set 39 is provided by three crescent-shaped slots 52, 58 and 64 formed in the stator face 24 which function as a fluid communication conduit to the corresponding inlet port or outlet port, as will be described in greater detail. In particular, a first stator slot 52 is fluidly coupled to the first outlet port 45 of the first outlet passage A. Thus, the crescent-shaped first stator slot 52 is located along the first imaginary circle 48, and extends along an arc angle of about 36° clockwise from the first outlet port 45

Similarly, a second stator slot 58 is fluidly coupled to the second outlet port 47 of the second outlet passage B. The slot 58 preferably also lies on the first imaginary circle 48 and extends counterclockwise from the second outlet passage preferable through an arc angle of about 36°.

For the second valve portion of the rotor valve apparatus 20, the third stator slot 64 is formed in the stator face 24 which is fluidly coupled to the second inlet port 46 of the second inlet passage 40. Thus, the crescent-shaped third stator slot 64 is also located along the first imaginary circle 48, and extends clockwise about 36° along an arc angle from the second inlet port 46.

Referring now to a rotor portion of the channel set 39, the rotor face 28 defines three substantially linear rotor grooves 70, 76 and 82 extending in a direction radially from the rotational axis 30. These grooves, depending upon which the discrete rotor position (i.e., first through fourth) the rotor is disposed, function as a conduit to enable fluid transfer between the first inlet port 38 and either the first outlet port 45 and the second outlet port 47, and between the second inlet port 46 and either the third outlet port 49 and the fourth outlet port 51.

A first rotor groove 70, configured to fluidly couple the first inlet port 38 to either one of the first outlet port 45 and second outlet port 47, includes an inlet end 72 positioned substantially at the rotational axis 30. (FIG. 4). Thus, the first rotor groove 70 is in continuous fluid communication with the first inlet port 38 during every discrete rotor position. The first rotor groove 70 further extends radially outward from axis 30 and terminates at an outlet end 74 lying on first imaginary circle 48.

Thus, as shown in FIGS. 4, 5A and 5B, in the first and second discrete rotor positions "1" and "2", the first rotor groove 70 maintains continuous fluid communication with first outlet port 45 via the first stator slot 52. In particular, in the first discrete rotor position "1" (FIG. 5A), the outlet end 74 of the first rotor groove 70 is fluidly coupled to the first stator slot 52 for fluid transfer of the first fluid from the first inlet passage 32 (in the direction of arrow 41 in FIG. 4) to the first outlet passage A (in the direction of arrow 75 in FIG. 4). As the rotor element rotates 36° counterclockwise to the second discrete rotor position of FIG. 5B, the outlet end 74 of the first rotor groove 70 is positioned in direct coaxial alignment with the first outlet port 45 of the first outlet passage A to maintain fluid coupling between the first inlet passage 32 and the first outlet passage A.

In a similar manner, referring now to FIGS. 5C and 5D, in the third and fourth discrete rotor positions "3" and "4", the rotor element 26 is rotated 36° counterclockwise to position the outlet end 74 of the first rotor groove 70 into direct coaxial alignment with the second outlet port 47 of the second outlet passage B. At this rotor position, the first inlet passage 32 will then be fluidly coupled to the second outlet passage B for the first valve portion of the rotor valve apparatus. Rotating the rotor element another 36° counterclockwise to the fourth rotor position of FIG. 5D, the outlet end 74 of the first rotor groove 70 is maintained in continuous fluid communication with the second outlet port 47 through the second stator slot 58.

Referring back to FIGS. 4 and 5A and the discrete rotor position "1" for the second valve portion of the rotor valve apparatus 20, the second rotor groove 76 is illustrated having an inlet end 78 lying on first imaginary circle 48 and an outlet end 80 extending radially outward from axis 30 and lying on second imaginary circle 50. The second rotor groove 76 is angularly positioned from first rotor groove 70 clockwise, preferably by an arc angle of about 144°, to selectively, fluidly couple the second fluid flowing through the second inlet port 46 (in the direction of arrow 43 in FIG. 4) to the third outlet port 49 of the third outlet passage C (in the direction of arrow 73 in FIG. 4). Such fluid communication is enabled since the inlet end 78 of the second rotor groove 76 is aligned with the third stator slot 64.

As the rotor element rotates 36° counterclockwise to the second discrete rotor position "2" of FIG. 5B, the outlet end 80 of the second rotor groove 76 is positioned in direct coaxial alignment with the fourth outlet port 51 of the fourth outlet passage D, while the inlet end 78 is coaxially aligned with the second inlet port 46. This, accordingly, fluidly couples the second inlet passage 40 to the fourth outlet passage D for fluid flow of the second fluid.

The third rotor groove 82 duplicates the configuration of second rotor groove 76, having an inlet end 84 lying on first imaginary circle 48 and an outlet end 86 extending radially outward from axis 30 and lying on second imaginary circle 50. As shown in FIGS. 5A–5D, third rotor groove 82 is radially oriented about rotor face 28 apart from second rotor groove 76 clockwise, preferably by an arc angle of about 72°. Thus, when rotor element 26 is placed at discrete rotor positions "1" and "2", the third rotor groove 82 is isolated against the stator face 24, and is nonoperational. However, in the discrete rotor positions "3" (FIG. 5C) and "4" (FIG. 5D), the second inlet port 46 is fluidly coupled to third outlet passage C and is fluidly coupled to the fourth outlet passage D, respectively.

Table 2 summarizes the operating modes of the valve of the present invention when rotor face 28 is placed in each of its four discrete positions.

TABLE 2

| ROTOR POSITION | FIRST FLUID | SECOND FLUID |
| --- | --- | --- |
| 1 | FIRST INLET PASSAGE 32 TO OUTLET PASSAGE A | SECOND INLET PASSAGE 40 TO OUTLET PASSAGE C |
| 2 | FIRST INLET PASSAGE 32 TO OUTLET PASSAGE A | SECOND INLET PASSAGE 40 TO OUTLET PASSAGE D |
| 3 | FIRST INLET PASSAGE 32 TO OUTLET PASSAGE B | SECOND INLET PASSAGE 40 TO OUTLET PASSAGE C |
| 4 | FIRST INLET PASSAGE 32 TO OUTLET PASSAGE B | SECOND INLET PASSAGE 40 TO OUTLET PASSAGE D |

While the above description details one specific "channel set" configuration of inlet and outlet passages, stator slots and rotor grooves to provide the desired operational mode combinations, it will be appreciated that other channel set configurations may be employed as well. For example, the first inlet port 38 need not to be positioned at the rotational axis 30, but may be placed on an imaginary circle encircling the rotational axis together with a corresponding stator slot. Further, the positioning of the second inlet port 46 and the third and forth outlet ports 49, 51 respectively, need not be positioned on the first and second imaginary circle. The first and second outlet ports 45 and 47, additionally, may be positioned anywhere along the corresponding first and second stator slots 52 and 58, respectively. This is also true with the positioning of the second inlet port 46 with the third stator slot 64.

In one particular alternative embodiment, by way of example, the alternating distribution of the second fluid between the third outlet passage C and the forth outlet passage D is accomplished through a different "channel set" configuration. As best viewed in FIGS. 6A–6D, while the configuration of the first valve portion (i.e., the first inlet port 38, and the first and second outlet ports 45, 47) remain unchanged, the configuration of the second valve portion is altered but yields the same fluid switching versatility.

Figure 6A:
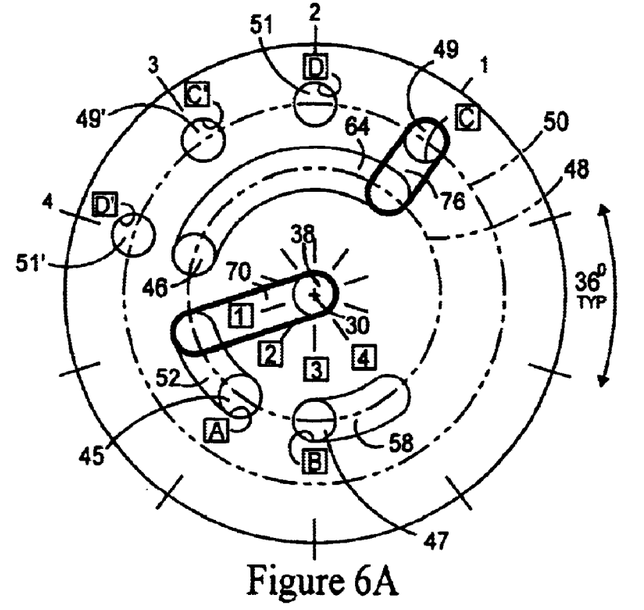
FIGS. 6A–6D is a series of schematic views of the rotor-stator interface plane of an alternative embodiment dual, three-way switching valve illustrating operation in a first through fourth discrete rotor position.
Figure 6B:
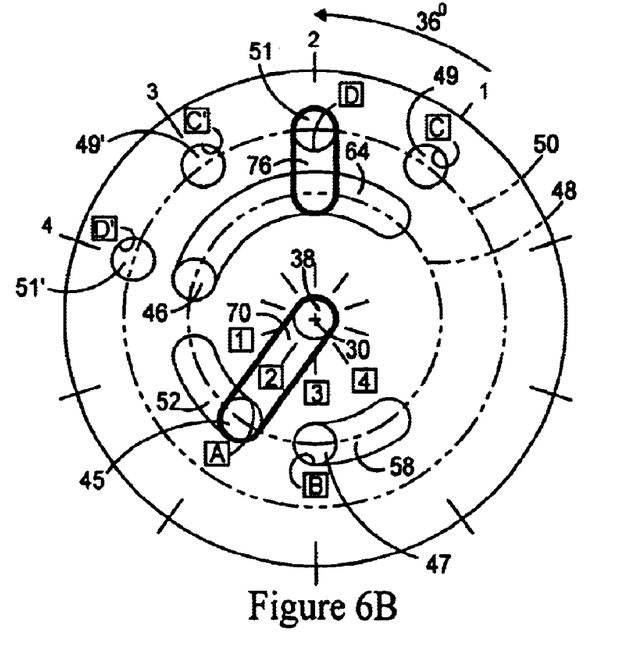
Figure 6C:
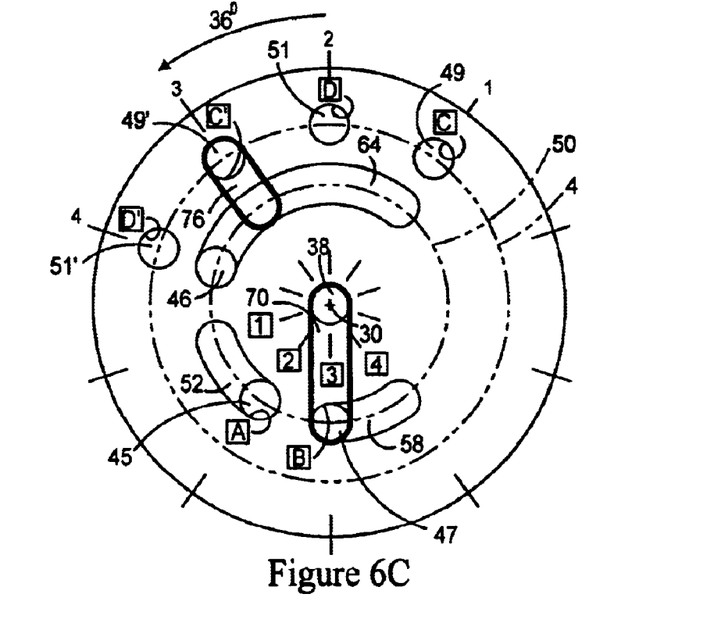
Figure 6D:
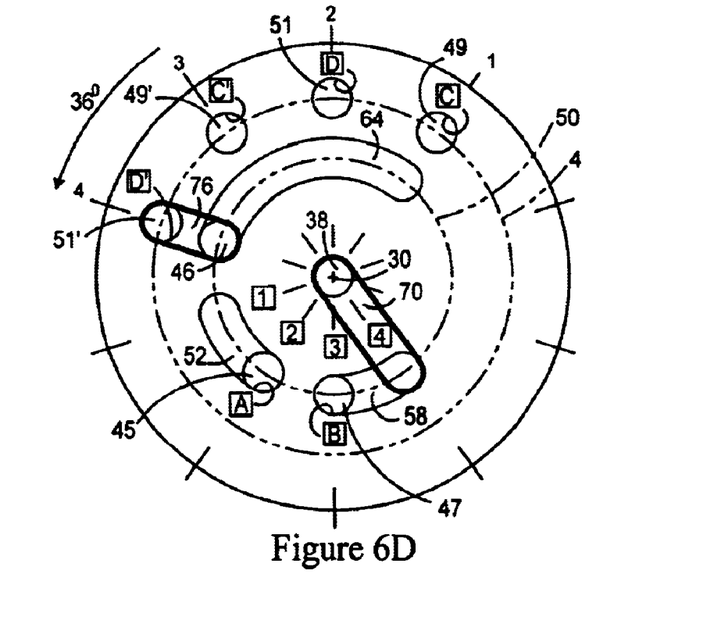

In this arrangement, the second inlet port 46 is repositioned along the first imaginary circle 48 an arc angle of about 36° clockwise from the first stator slot 52. The crescent-shaped third stator slot 64 is further extended along the first imaginary circle 48 an arc angle of about 108° clockwise from the second inlet port 46. Accordingly, the second rotor groove 76 of the rotor element 26 is maintained in continuous fluid communication with the second inlet port 46 (via the third stator slot 64) during the entire rotor sequence from the first rotor position "1" (FIG. 6A) to the last rotor position "4" (FIG. 6D). In this configuration, since the third rotor groove has been removed, it is apparent that only the second rotor groove 76 functions as a fluid communication conduit during the entire sequence.

To enable the alternating fluid flow distribution of the second valve portion of the rotor valve apparatus 20 from the second inlet passage 40 to the third outlet passage C and the fourth outlet passage D, a fifth outlet port 49' and a sixth outlet port 51' are provided at the stator face 24. As shown in FIG. 6, the fifth outlet port 49' is positioned along the second imaginary circle 50 at an arc angle of about 36° counterclockwise from the fourth outlet port 51. This fifth outlet port 49' is fluidly coupled to the third outlet passage C, while the sixth outlet port 51', positioned another 36° counterclockwise from the fifth outlet port 49', is fluidly coupled to the fourth outlet passage D. This fluid coupling with the respective outlet passages C and D may be performed internally within the body of the stator element 22 or may be performed externally thereto, as long as the third outlet port 49 and the fifth outlet port 49', and the fourth outlet port 51 and the sixth outlet port 51', respectively, are ultimately fluidly coupled to the same respective passage or conduit.

In accordance with this specific embodiment, the fifth outlet port 49' and the sixth outlet port 51', and extended third stator slot 64 broaden the operation of second rotor groove 76 to replace the fluid switching functionality of eliminated third rotor groove 82 when rotor element 26 is placed in rotor positions "3" and "4". As mentioned, the operation of the rotor valve apparatus is identical to the above described embodiment during the first discrete rotor position "1" (FIG. 6A) and the second discrete rotor position "2" (FIG. 6B), and will thus not be described in detail. However, in the third discrete rotor position "3" of FIG. 6C, as the rotor element 26 is rotated about the rotational axis 30 about 36° counterclockwise, the second rotor groove 76 is rotated to provide a communication conduit between the second inlet port 46 and the fifth outlet port 49', via the third stator slot 64. That is, fluid flow is again provided between the second inlet passage 40 and the third outlet passage C.

Similarly, as best viewed in FIG. 6D, as the rotor element 26 is rotated about the rotational axis 30 another 36° counterclockwise to the fourth discrete rotor position "4", the second rotor groove 76 is repositioned to provide a communication conduit between the second inlet port 46 and the sixth outlet port 51', via the third stator slot 64. This, of course, provides fluid flow between the second inlet passage 40 and the fourth outlet passage D.

Thus, the invention in its various embodiments provides a valve, which is of simple construction and reliable operation, and with which a first fluid at a first valve inlet port may be selectively coupled to and placed in fluid communication with a first or a second outlet passage and, simultaneously and independently, a second fluid at a second inlet port may be selectively coupled to and placed in fluid communication with a third or a fourth outlet passage when the valve rotor is placed at each of four corresponding discrete positions relative to the valve stator.

The configuration and placement of fluid inlet and outlet passages, and arc-segment and linear fluid channels may be manipulated in many ways to provide intersections at the rotor-stator interface to fluidly couple and convey the valve fluids to achieve the objects and advantages of the invention. Although the present invention has been described in terms of a set of fluid conveying channels comprising grooves in the rotor and set of fluid conveying channels comprising slots in the stator, the invention may also be described and understood in terms of a valve channel set comprising rotor groves and stator slots of a first valve selectively directing the first fluid, and, of a valve channel set comprising rotor grooves and stator slots of a second valve selectively directing the second fluid. In addition, although a two-inlet dual valve system has been described, any number of inlet passages may be positioned around the imaginary circles. It is also noted that while a valve with planar faces is shown, there are also embodiments of the valves with cylindrical surfaces of the stator and rotor that lie adjacent.

Although particular embodiments of the invention have been described and illustrated herein, it is recognized that modifications and variations may readily occur to those skilled in the art and that inventions may be embodied in many other specific forms without departing from the spirit or scope of the inventions, and consequently, it is intended that the claims be interpreted to cover such modifications and equivalents.

What is claimed is:

1. A dual, random access, 3-way fluid switching rotary valve apparatus comprising:

a stator element defining a first inlet passage fluidly coupled to a first fluid source and having a first inlet port terminating at a stator face lying in an interface plane, and defining a second inlet passage fluidly coupled to a second fluid source and having a second inlet port terminating at the stator face, said stator element further defining a first, a second, a third and a fourth outlet passage each in fluid communication with said stator face; and a rotor element defining a rotor face oriented in the interface plane in opposed relationship to and contacting said stator face in a fluid-tight manner, said rotor element being rotatably movable about a rotational axis, relative to said stator face, for rotational movement of said rotor face to at least a discrete first, second, third and fourth rotor position, said rotor face and said stator face cooperatively defining a channel set enabling fluid communication between the first fluid source and one of the first and second outlet passage, and enabling fluid communication between the second fluid source and one of the third and fourth outlet passage, such that:

in the first rotor position, said channel set fluidly couples said first inlet port to the first outlet passage and fluidly couples said second inlet port to the third outlet passage;

in the second rotor position, said channel set fluidly couples said first inlet port to the first outlet passage and fluidly couples said second inlet port to the fourth outlet passage;

in the third rotor position, said channel set fluidly couples said first inlet port to the second outlet passage and fluidly couples said second inlet port to the third outlet passage; and;

in the fourth rotor position, said channel set fluidly couples said first inlet port to the second outlet passage and fluidly couples said second inlet port to the fourth outlet passage.

2. The valve apparatus according to claim 1, wherein said channel set includes an elongated first rotor groove defined in said rotor face and extending in a direction radially from the rotational axis, said first rotor groove having one portion in continuous fluid communication with said first inlet port during relative rotational movement between the rotor element and said stator element.

3. The valve apparatus according to claim 2, wherein said first inlet port is positioned substantially at the rotational axis.

4. The valve apparatus according to claim 2, wherein the first outlet passage includes a first outlet port defined in said stator face and terminating at a first stator slot of said channel set, said first stator slot having one portion in fluid communication with said first rotor groove in the first rotor position, and having another portion in fluid communication with said first rotor groove in the second rotor position, and;

the second outlet passage includes a second outlet port terminating at a second stator slot of said rotor channel set and defined in said stator face, said second stator slot having one portion in fluid communication with said first rotor groove in the third rotor position, and having another portion in fluid communication with said first rotor groove in the fourth rotor position.

5. The valve apparatus according to claim 4, wherein said first stator slot and said second stator slot are crescent-shaped and extend about the rotational axis, and said first stator slot, said second stator slot, said first outlet port and said second outlet port are all substantially located on an imaginary circle in the interface plane.

6. The valve apparatus according to claim 5, wherein said first inlet port is positioned substantially at the rotational axis.

7. The valve apparatus according to claim 1, wherein said first, second, third and fourth rotor positions are positioned consecutively.

8. The valve apparatus according to claim 1, wherein said channel set includes an elongated second rotor groove defined in said rotor face and extending in a direction radially from the rotational axis, said second rotor groove having one portion in fluid communication with said second inlet port during relative rotational movement between said rotor element and said stator element from said first to said second discrete rotor position.

9. The valve apparatus according to claim 8, wherein said second inlet port is positioned substantially at the rotational axis.

10. The valve apparatus according to claim 8, wherein said second inlet port further terminating at a third stator slot of said channel set defined in said stator face, said third stator slot having one portion in fluid communication with said second rotor groove in the first rotor position, and having another portion in fluid communication with said second rotor groove in the second rotor position.

11. The valve apparatus according to claim 10, wherein said third stator slot is crescent-shaped and extends about the rotational axis, and wherein said third stator slot and said second inlet port are all substantially located on an imaginary circle in the interface plane.

12. The valve apparatus according to claim 8, wherein the third outlet passage includes a third outlet port terminating at said stator face and oriented to fluidly couple with the second rotor groove for fluid communication between the second fluid source and the third outlet passage in the first rotor position, and;

the fourth outlet passage includes a fourth outlet port terminating at said stator face and oriented to fluidly couple with the second rotor groove for fluid communication between the second fluid source and the fourth outlet passage in the second rotor position.

13. The valve apparatus according to claim 12, wherein said second inlet port further terminating at a third stator slot of said channel set and, said third stator slot having one portion in fluid communication with said second rotor groove in the first rotor position, and having another portion in fluid communication with said second rotor groove in the second rotor position.

14. The valve apparatus according to claim 13, wherein said channel set further includes an elongated third rotor groove spaced apart from said second rotor groove, said third rotor groove defined in said rotor face and extending in a direction radially from the rotational axis, wherein, in the third rotor position, said third rotor groove having one portion in fluid communication with said third outlet port and having another portion in fluid communication with said one portion of said third stator slot for fluid communication between the second fluid source and the third outlet passage, and;

wherein, in the fourth rotor position, said third rotor groove having one portion in fluid communication with said fourth outlet port and having another portion in fluid communication with said other portion of said third stator slot for fluid communication between the second fluid source and the fourth outlet passage.

15. The valve apparatus according to claim 14, wherein said third stator slot is crescent-shaped, in continuous fluid communication with said second inlet port, and extends about the rotational axis and wherein said third stator slot and said second inlet port are all substantially located on an imaginary circle in the interface plane.

16. The valve apparatus according to claim 8, wherein the third outlet passage includes a third outlet port terminating at said stator face and oriented to fluidly couple with said second rotor groove for fluid communication between the second fluid source and the third outlet passage in the first rotor position, and;

the fourth outlet passage includes a fourth outlet port terminating at said stator face and oriented to fluidly couple with the second rotor groove for fluid communication between the second fluid source and the fourth outlet passage in the second rotor position.

17. The valve apparatus according to claim 16, wherein said third outlet port and said fourth outlet port are both substantially located on an imaginary circle in the interface plane.

18. The valve apparatus according to claim 17, wherein said channel set further includes an elongated third rotor groove spaced apart from said second rotor groove, said third rotor groove defined in said rotor face and extending in a direction radially from the rotational axis, wherein, in the third rotor position, said third rotor groove having one portion in fluid communication with said third outlet port and having another portion in fluid communication with said one portion of said third stator slot for fluid communication between the second fluid source and the third outlet passage, and;

wherein, in the fourth rotor position, said third rotor groove having one portion in fluid communication with said fourth outlet port and having another portion in fluid communication with said another portion of said third stator slot for fluid communication between the second fluid source and the fourth outlet passage.

19. The valve apparatus according to claim 18, wherein said third stator slot is crescent-shaped, in continuous fluid communication with said second inlet port, and extends about the rotational axis, and wherein said third stator slot and said second inlet port are all substantially located on a first imaginary circle in the interface plane.

20. The valve apparatus according to claim 19, wherein said third outlet port and said fourth outlet port are both substantially located on a second imaginary circle in the interface plane.

21. The valve apparatus according to claim 12, wherein the third outlet passage further includes a fifth outlet port terminating at said stator face, said fifth outlet port being spaced apart from said third outlet port and oriented to fluidly couple with the radially extending second rotor groove for fluid communication between the second fluid source and the third outlet passage in the third rotor position, and;

the fourth outlet passage includes a sixth outlet port terminating at said stator face, said sixth outlet port being spaced apart from said fourth outlet port and oriented to fluidly couple with said second rotor groove for fluid communication between the second fluid source and the fourth outlet passage in the fourth rotor position.

22. The valve apparatus according to claim 21, wherein said second inlet port further terminating at a third stator slot of said channel set defined in said stator face, said third stator slot having a first portion in fluid communication with the radially extending second rotor groove in the first rotor position, a second portion in fluid communication with said second rotor groove in the second rotor position, a third portion in fluid communication with said second rotor groove in the third rotor position, a fourth portion in fluid communication with said stator groove in the fourth rotor position.

23. The valve apparatus according to claim 22, wherein said third stator slot is crescent-shaped, in continuous fluid communication with said second inlet port, and extends about the rotational axis and wherein said third stator slot and said second inlet port are both substantially located on a first imaginary circle in the interface plane.

24. The valve apparatus according to claim 23, wherein the third, fourth, fifth and sixth outlet ports are all substantially located on a second imaginary circle in the interface plane.

25. A dual, random access, 3-way fluid switching rotary valve apparatus comprising:

a stator element defining a first inlet passage fluidly coupled to a first fluid source and having a first inlet port terminating at a stator face lying in an interface plane, and defining a second inlet passage fluidly coupled to a second fluid source and having a second inlet port terminating at the stator face, said stator element further defining a first, a second, a third and a fourth outlet passage each in fluid communication with said stator face; and a rotor element defining a rotor face oriented in the interface plane in opposed relationship to and contacting said stator face in a fluid-tight manner, said rotor element being rotatably movable about a rotational axis, relative to said stator face, for rotational movement of said rotor face to at least a discrete first, second, third and fourth rotor position;

said rotor face and said stator face cooperatively defining a first valve channel set enabling fluid communication between the first fluid source and one of the first and second outlet passage, and cooperatively defining a second valve channel set enabling fluid communication between the second fluid source and one of the third and fourth outlet passage, such that:

in the first rotor position, said first valve channel set fluidly couples said first inlet port to the first outlet passage, and said second valve channel set fluidly couples said second inlet port to the third outlet passage;

in the second rotor position, said first valve channel set fluidly couples said first inlet port to the first outlet passage, and said second valve channel set fluidly couples said second inlet port to the fourth outlet passage;

in the third rotor position, said first valve channel set fluidly couples said first inlet port to the second outlet passage, and said second valve channel set fluidly couples said second inlet port to the third outlet passage; and in the fourth rotor position, said first valve channel set fluidly couples said first inlet port to the second outlet passage, and said second valve channel set fluidly couples said second inlet port to the fourth outlet passage and, wherein;

said first valve channel set includes an elongated groove defined in said rotor face and extending in a direction radially from the rotational axis, said groove of said first valve channel set having one portion in continuous fluid communication with said first inlet port during relative rotational movement between said rotor element and said stator element;

the first outlet passage includes a first outlet port terminating at a first slot of said first valve channel set defined in said stator face, said first slot having one portion in fluid communication with the radially extending groove of said first valve channel set in the first rotor position, and having another portion in fluid communication with the groove of said first valve channel set in the second rotor position;

the second outlet passage includes a second outlet port terminating at a second slot of said first valve channel set defined in said stator face, said second slot having one portion in fluid communication with the radially extending groove of said first valve channel set in the third rotor position, and having another portion in fluid communication with the groove in the fourth rotor position;

said second valve channel set further includes a slot defined in said stator face, said slot of said second valve channel set having one portion in continuous fluid communication with said second inlet port;

the third outlet passage includes a third outlet port terminating at said stator face and oriented to fluidly couple with a radially extending first groove of said second valve channel set defined in said rotor face, said first groove of said second valve channel set having one portion in fluid communication with said third outlet port and having another portion in fluid communication with said slot of said second valve channel set in the first rotor position and to fluidly couple with a radially extending second groove of said second valve channel set, spaced apart from said first groove of said second channel set, said second groove of said second valve channel set having one portion in fluid communication with said third outlet port and having another portion in fluid communication with said slot of said second valve channel set in the third rotor position; and, the fourth outlet passage includes a fourth outlet port terminating at said stator face and oriented to fluidly couple with said first groove of said second valve channel set, said first groove of said second valve channel set having one portion in fluid communication with said fourth outlet port and having another portion in fluid communication with said slot of said second valve channel set in the second rotor position and to fluidly couple with said second groove of said second valve channel set, said second groove of said second valve channel set having one portion in fluid communication with said fourth outlet port and having another portion in fluid communication with said slot of said second valve channel set in the fourth rotor position.

26. The valve apparatus according to claim 25, wherein said first inlet port is positioned substantially at the rotational axis.

27. The valve apparatus according to claim 25 wherein said first and said second slot of said first valve channel set are crescent-shaped, extending about the rotational axis, and said first and said second slots of said first valve channel set, said first outlet port and said second outlet port are all substantially located on an imaginary circle in the interface plane.

28. The valve apparatus according to claim 25, wherein said slot of said second valve channel set is crescent-shaped, in continuous fluid communication with said second inlet port, and extends about the rotational axis, and said slot of said second valve channel set and said second inlet port are all substantially located on a first imaginary circle in the interface plane.

29. The valve apparatus according to claim 28, wherein said third outlet port and said fourth outlet port are both substantially located on an imaginary circle in the interface plane and spaced apart extending about the rotational axis.

\* \* \* \* \*